United States Patent [19]

Hanania

[11] Patent Number: 4,903,749

[45] Date of Patent: Feb. 27, 1990

[54] AUTOMOBILE PROTECTIVE COVER

[76] Inventor: Amnon Hanania, 4809 Laurel Grove #27, North Hollywood, Calif. 91607

[21] Appl. No.: 286,686

[22] Filed: Dec. 20, 1988

[51] Int. Cl.$^4$ .............................................. B60J 11/00
[52] U.S. Cl. .................................. 160/370.2; 296/95.1
[58] Field of Search ........ 160/370.2, 84.1, DIGS. 2–4; 296/95.1, 136, 97.1, 97.7, 97.8

[56] References Cited

U.S. PATENT DOCUMENTS

| | | | |
|---|---|---|---|
| 3,085,621 | 4/1963 | Meranto | 160/370.2 X |
| 4,635,993 | 1/1987 | Hooper et al. | 296/95.1 |
| 4,779,918 | 10/1988 | McNamee | 296/95.1 |
| 4,799,728 | 1/1989 | Akers et al. | 160/370.2 X |
| 4,842,324 | 6/1989 | Carden | 160/370.2 |

Primary Examiner—Blair M. Johnson
Attorney, Agent, or Firm—John J. Posta, Jr.

[57] ABSTRACT

A cover for use to cover the windshield and the forward roof portion of an automobile where a moonroof may be installed is disclosed which cover is retained by being clamped between the window frames of the front doors and the front door frames of the automobile. The cover is of one-piece construction, and may easily be installed by a single person to snugly cover the entire windshield and front portion of the roof of a car, protecting it both from sun and from inclement weather. The cover has anti-theft provisions built therein to effectively secure the cover once installed against removal by wind or theft.

20 Claims, 2 Drawing Sheets

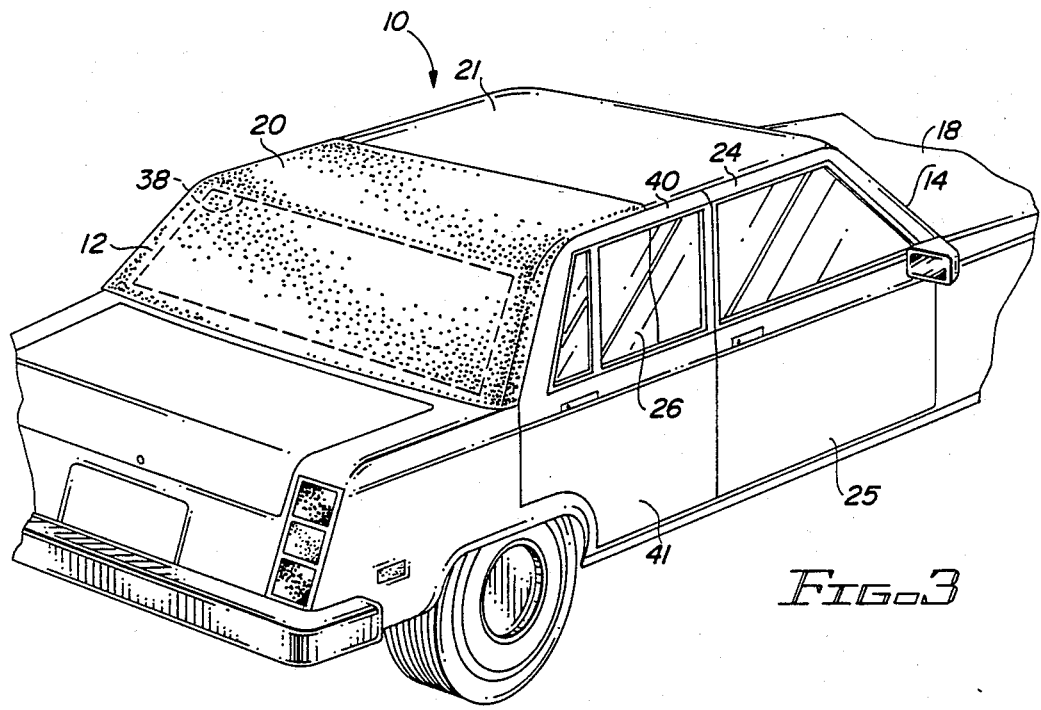
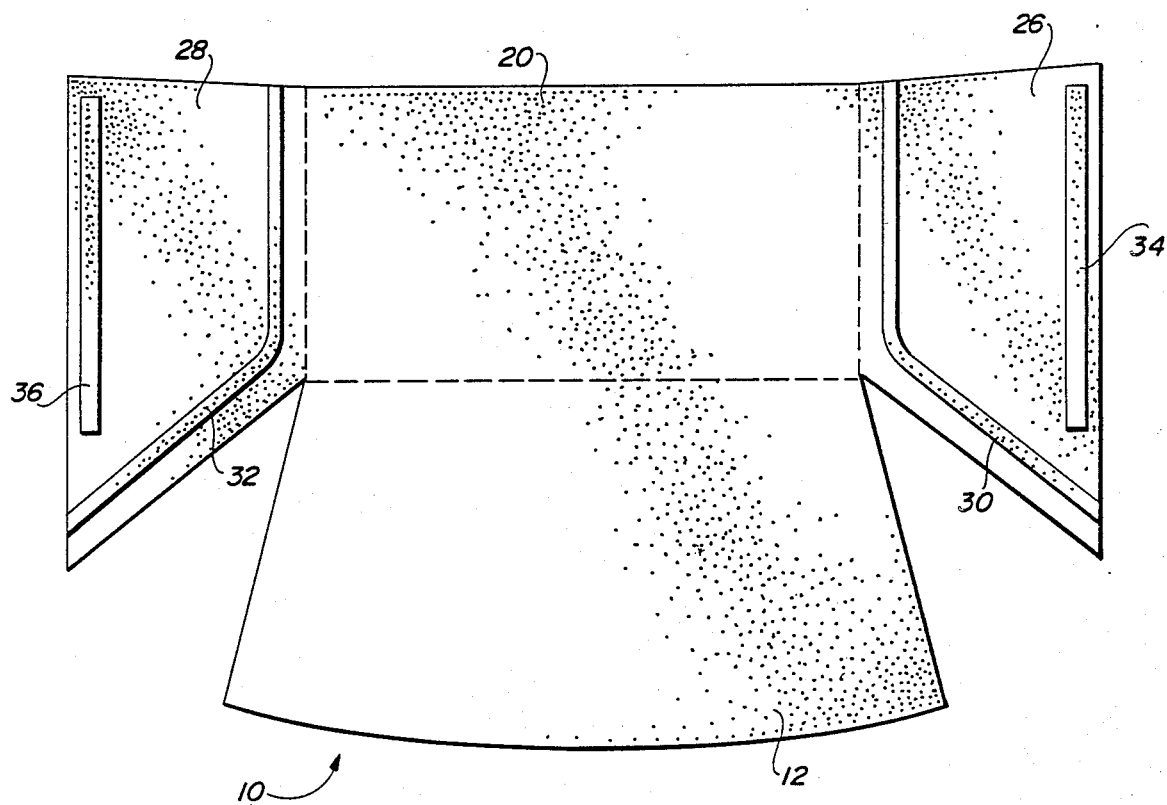

AUTOMOBILE PROTECTIVE COVER

BACKGROUND OF THE INVENTION

Field of the Invention

The present invention relates generally to protective covers for automobiles, and more particularly to a cover for placement over the windshield and the forward roof portion of an automobile, which cover is retained by being clamped between the closed door and the door frame of the automobile.

For nearly as long as there have been enclosed automobiles having windows, people have attempted to contrive devices to cover one or more of the windows of an automobile when the automobile is parked outdoors. The need for such covers is particularly evident in inclement weather, especially in the colder climates during winter, when snow or sleet will quickly cover the windows of a parked car, particularly the windshield, which is typically more sloped than are the other windows in a car. Most such covers are accordingly designed to cover at least the windshield of a parked car.

Examples of such window covers are shown in U.S. Pat. No. 2,065,242, to Omerly, Jr., in U.S. Pat. No. 2,599,066, to Osborn, in U.S. Pat. No. 2,646,118, to Berty, in U.S. Pat. No. 3,046,048, to Cheney, in U.S. Pat. No. 4,406,320, to Bingham, and in U.S. Pat. No. 4,597,608, to Duffy. The Omerly, Jr. patent teaches a windshield cover held on by straps fastened to door hinges and straps adapted to be held between the closed door and the door frame of the car. The Osborn patent shows a windshield cover held in place by straps held between the closed door and the door frame of the car, with several of the straps being attached to suction cups attached to the inside of the windshield.

The Berty patent illustrates a windshield cover held in place by suction cups on the outside of the windshield and by straps held between the closed door and the door frame of the car. The Cheney patent shows a windshield cover held in place by magnets. The Bingham patent illustrates a window cover for use on any window of a car, which is held in place by straps held between the closed door and the door frame of the car. The Duffy patent teaches a windshield cover held between the closed door and the door frame of the car.

While all of these references provide at least some degree of protection to an automobile windshield from snow or sleet, each of the devices taught by the references unfortunately has some disadvantage which reduces the degree of utility of the device. For example, the Berty, Bingham, and Duffy covers do not cover the entire windshield. It will be realized by those living in colder climates that if the entire windshield is not covered, the wind may drive snow or sleet between the cover and the windshield. The Omerly, Jr. device is obsolete, since cars no longer have hinges located on the outside of the door.

Another significant problem is that many of the above covers are subject to theft. It will be appreciated that if the covers are merely fastened to the outside of the car, it will be too easy for a thief to quickly remove and steal them. The Cheney cover, which is mounted on the car with magnets, is particularly subject to this problem. In addition, the Omerly, Jr., Berty, and Bingham references have straps enclosed between the car door and the door frame which straps may relatively easily be pulled out. Only the Osborn and Duffy references have significant resistance to theft.

Another significant use of automobile window covers is to keep sun out of a car. While several of the covers have utility in this function, they have largely been preempted for use in accomplishing this function by a folded cardboard cover, which may be placed on the inside of the windshield and retained by the sun visors. However, neither the covers cited above nor the cardboard cover have any utility in covering a moonroof, which is a clear or translucent window located in the front top portion of the roof of a car. While theoretically two prior art design covers cited above could be used together, most drivers would have little use for such an apparatus with two separate covers.

It is accordingly the primary object of the present invention to provide a cover apparatus which will cover both the windshield and the front portion of the roof of a car where a moonroof would be located. In order to present the highest degree of protection, it is also an objective of the cover of the present invention that it cover the entire windshield, as well as the entire front portion of the roof of a car, in a snug and secure fashion not subject to removal or displacement by the wind. The improved cover of the present invention should also provide advantageous utility in protecting the interior of an automobile from the hot sun in addition to preventing the windshield from being covered by snow or sleet in inclement weather.

It is a further objective of the present invention that the improved cover be designed to allow it to be easily and quickly installed by a single person, without any need for either assistance or tools. In the furtherance of this objective, it is desirable that the improved cover of the present invention be of simple, one-piece construction. It is also an objective that the improved cover have adequate anti-theft provision built into the cover, with the anti-theft provision not increasing the difficulty of installation of the cover.

Further, it is an objective that the improved cover of the present invention be of inexpensive construction, and be adaptable to fit virtually any existing car or truck. The cover should also be durable and long-lasting, to provide a high degree of quality even though it is of inexpensive construction. Finally, the improved cover of the present invention must provide all of the aforesaid advantages and objectives without resulting in any significant disadvantage.

SUMMARY OF THE INVENTION

The disadvantages and limitations of the background art discussed above are overcome by the present invention. With this invention, a single-piece cover is arranged and configured to fit over the windshield and the front portion of the roof of an automobile. The cover accordingly includes a window-covering portion designed to cover the windshield of an automobile, with this window-covering portion being sufficiently large to cover the entire windshield from top to bottom and from side to side. In the preferred embodiment, the window-covering portion of the cover also extends over a small portion of area immediately in front of the windshield.

A roof-covering portion of the cover, which is attached at the front thereof to the rear of the window-covering portion of the cover at a location approximating the top of the windshield, extends back from the window-covering portion to cover the front segment of the roof of the automobile. The width of the roof-covering segment of the cover extends from one side of the roof of the car to the other. This roof-covering portion of the cover extends sufficiently far back toward the rear of the roof to cover a moonroof, if the automobile the cover is installed on has a moonroof. In the preferred embodiment, the roof-covering portion of the cover generally extends back to approximately the location of the rear of the front doors of the automobile.

First and second side portions of the cover are attached to the sides of the window-covering and roof-covering portions of the cover. These first and second side portions of the cover are configured similarly to the shape of the front side window frames of an automobile. The front edges of the first and second side portions of the cover are cut at an angle approximating the rake angle of the windshield of a car. The top and back edges of the first and second side portions of the cover extend adjacent the top edges and back edges of the front window frames of an car. The bottom edges of the first and second side portions of the cover are located at or slightly below the approximate location of the side window line of a car.

The front edges of the first and second side portions of the cover are attached to the side edges of the window-covering portion of the cover, and the top edges of the first and second side portions of the cover are attached to the side edges of the roof-covering portion of the cover. The cover is installed by opening the front doors of the automobile, and placing the window-covering portion of the cover over the windshield of the automobile and the roof-covering portion of the cover over the front portion of the roof of the automobile. The side portions of the cover will hang down in the front door frames of the automobile, and the doors may be closed to secure the side portions of the cover between the front doors and the front door frames.

In the preferred embodiment, the cover includes thickened segments of material located on the side portions of the cover in a position just inside the car when the doors are closed to secure the side portions of the cover between the front doors and the front door frames. These thickened segments of material in the side portions of the cover prevent the side portions of the cover from being pulled out of the closed doors by someone attempting to steal the cover. The thickened segments of material may be piping which is sewn into the side portions of the cover. Alternatives to the piping include other rolls of material attached to the side portions of the cover, or balls attached at intervals to the side portions of the cover.

Also included in the preferred embodiment are weights located on the bottom edges of the side portions of the cover. These weights function to hold the cover on the automobile when it is being installed, before the front doors are closed. The weights also function to hold the cover snugly on the car when the doors are being closed, thereby according the cover a desirable snug fit on the car when the cover is installed.

The cover may be made of a variety of thin, flexible sheet materials, including vinyl, fabric, and fabric-reinforced vinyl. In the preferred embodiment fabric-reinforced waterproof vinyl material with a soft inside lining is used to afford the maximum degree of protection to the car. If the application of the cover is primarily for keeping sunlight out of the car, the color of the cover is white or another light-colored shade.

In a variation, the cover may be placed over the rear window and the rear portion of the roof of a four-door automobile. In this case, the side portions of the cover will be secured between the rear doors of the automobile and the rear door frames of the automobile. This arrangement is particularly useful either when the cover is used in conjunction with a second cover installed over the windshield and the front portion of the roof, or when the cover is being used to keep sunlight directed toward the car from the rear from entering and heating the interior of the car.

It may thus be perceived that the cover of the present invention covers both the windshield and the front portion of the roof of a car where a moonroof (if the car has one) is located. The cover of the present invention thereby presents a high degree of protection by completely covering the entire windshield, as well as the entire front portion of the roof of a car, in a snug and secure fashion not vulnerable to removal or displacement by the wind. In addition to preventing the windshield from being covered by snow or sleet in inclement weather, the improved cover of the present invention may also be used to advantageously protect the interior of an automobile from the hot sun.

The improved cover of the present invention is designed to allow it to be easily and quickly installed by a single person, without any need for either assistance or tools. In addition, it is of simple, one-piece construction further facilitating installation, removal, and storage of the cover. The improved cover also has anti-theft provisions built into the cover, with the anti-theft provisions not increasing the difficulty of installation or removal of the cover.

Further, the improved cover of the present invention is of inexpensive construction, and may be made in several sizes which are adaptable to fit virtually any existing car or truck. The cover is also durable and long-lasting, thereby providing a high degree of quality even though the cover is of inexpensive construction. Finally, the improved cover of the present invention provides all of the aforesaid advantages and objectives without resulting in any significant disadvantage.

DESCRIPTION OF THE DRAWINGS

These and other advantages of the present invention are best understood with reference to the drawings, in which:

FIG. 3 is a perspective view illustrating the improved automobile cover of the present invention installed to cover the rear window and rear portion of the roof of an automobile; and FIG. 4 is a plan view illustrating the improved automobile cover of the present invention partially unassembled for clarity, and showing the locations of thickened segments of material used to prevent theft of the automobile cover and weights used to facilitate installation of the automobile cover.

DETAILED DESCRIPTION OF THE PREFERRED EMBODIMENT

Figure 1:
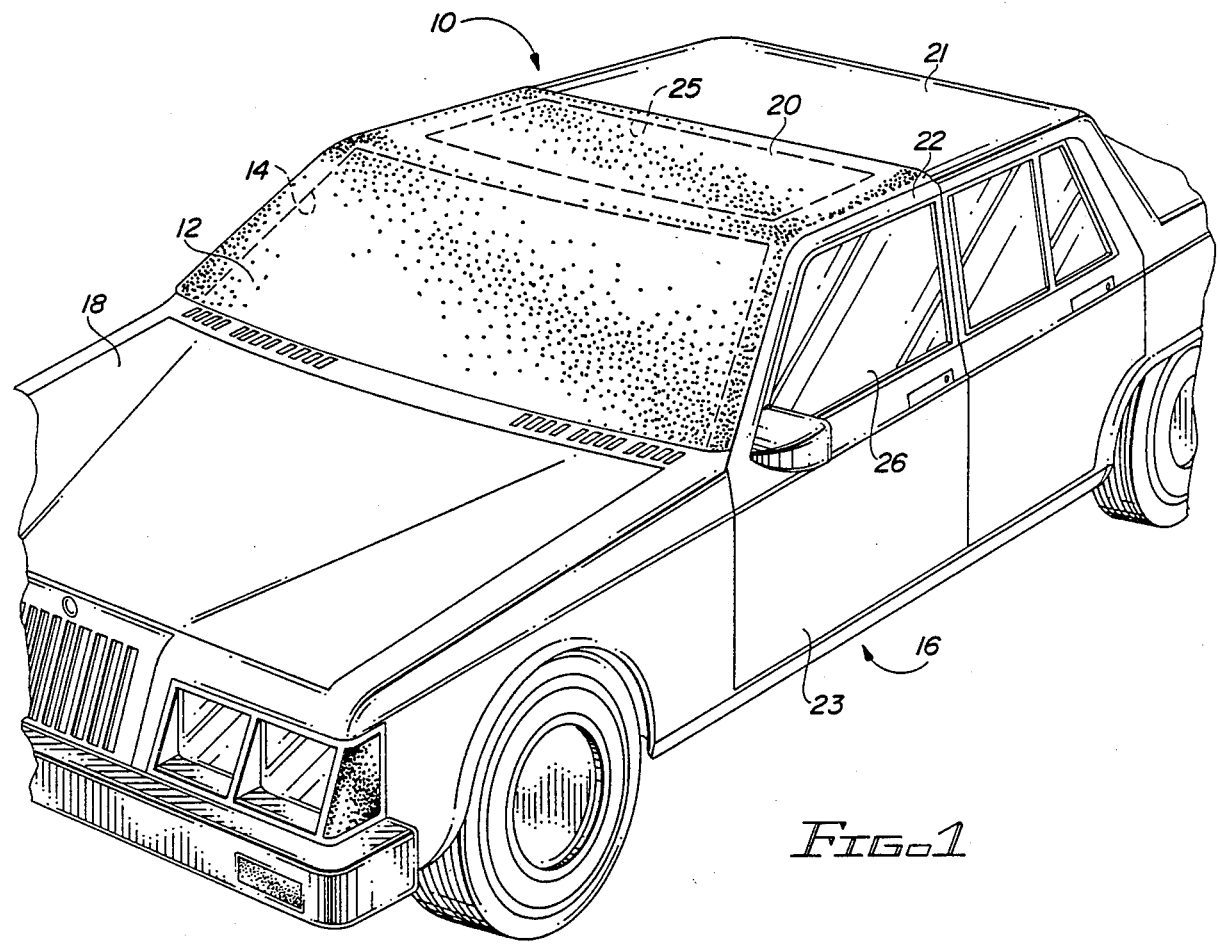
FIG. 1 is a perspective view illustrating the improved automobile cover of the present invention installed to cover the windshield and moonroof of an automobile.
Figure 2:
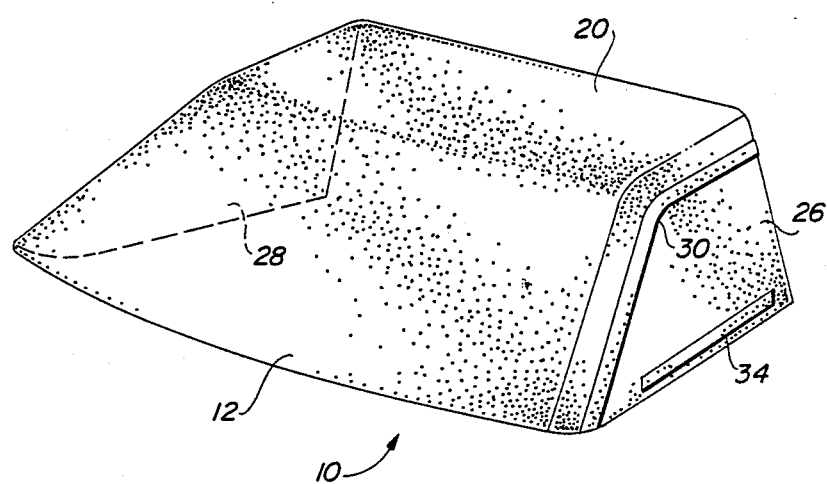
FIG. 2 is a perspective view illustrating the improved automobile cover of the present invention in a configuration similar to its installed configuration shown in FIG. 1.

The preferred embodiment of an automobile cover 10 constructed according to the teachings of the present invention is shown in FIGS. 1, 2, and 4. The automobile cover 10 is arranged and configured to fit over the windshield and the front portion of the roof of an automobile, as shown in FIG. 1. The automobile cover 10 is comprised of four main segments, which are assembled into the one-piece structure illustrated.

The first of these four main segments of the automobile cover 10 is a window-covering portion 12, which, as its name suggests, is designed to cover a windshield 14 of an automobile 16. As shown in FIG. 1, the window-covering portion 12 of the automobile cover 10 is sufficiently large to cover the entire windshield 14 from top to bottom and from side to side. The configuration of the window-covering portion 12 of the automobile cover 10 is similar to the shape of a typical windshield of a car, as best shown in FIG. 4. In the preferred embodiment shown in FIG. 1, the window-covering portion 12 of the automobile cover 10 also extends over a small portion of area immediately in front of the windshield 14, such as the back of the hood 18 of the automobile 16.

The second main segment of the automobile cover 10 is a roof-covering portion 20 of the automobile cover 10. The width of the roof-covering portion 20 of the automobile cover 10 extends from one side of the roof 21 of the automobile 16 to the other. Typically, the width of the roof-covering portion 20 of the automobile cover 10 is approximately the width of the roof 21 from the top of the window frame 22 of the left front door 23 to the top of the window frame 24 of the right front door 25. The roof-covering portion 20 of the automobile cover 10 is attached at the front thereof to the rear of the window-covering portion 12 of the automobile cover 10, at a location approximately adjacent the top of the windshield 14.

The roof-covering portion 20 of the automobile cover 10 extends back from the window-covering portion 12 of the cover 10 to cover the front segment of the roof 21 of the automobile 16. The roof-covering portion 20 of the automobile cover 10 extends sufficiently far back toward the rear of the roof 21 to cover a moonroof 25, if the automobile 16 the automobile cover 10 is installed on has a moonroof 25 installed therein. In the preferred embodiment, the roof-covering portion 20 of the automobile cover 10 generally extends back to approximately the location of the rear of the window frames 22 and 24 of the left and right front doors 23 and 25, respectively, of the automobile 16.

The two remaining main segments of the automobile cover 10 are a first side portion 26 of the automobile cover 10 and a second side portion 28 of the automobile cover 10. The first and second side portions 26 and 28 of the automobile cover 10 are attached to the sides of the window-covering portion 12 and the roof-covering portion 20 of the automobile cover 10. In the description of the first and second side portions 26 and 28 of the automobile cover 10, reference is made to FIGS. 1, 2, and 4.

The first side portion 26 of the automobile cover 10 is configured similarly to the shape of the window frame 22 of the left front door 23 of the automobile 16. The front edge of the first side portion 26 of the automobile cover 10 is cut at an angle approximating the rake angle of the left side of the windshield 14 of the automobile 16. The top and back edges of the first side portion 26 of the automobile cover 10 extend adjacent the top edge and back edge of the window frame 22 of the left front door 23 of the automobile 16. The bottom edge of the first side portion 26 of the automobile cover 10 is located at or slightly below the approximate location of the lower portion of the window frame 22 of the left front door 23 of the automobile 16.

In like manner, the second side portion 28 of the automobile cover 10 is configured similarly to the shape of the portion of the window frame 24 of the right front door 25 above the side window line of the automobile 16. The front edge of the second side portion 28 of the automobile cover 10 is cut at an angle approximating the rake angle of the right side of the windshield 14 of the automobile 16. The top and back edges of the second side portion 28 of the automobile cover 10 extend adjacent the top edge and back edge of the window frame 24 of the right front door 25 of the automobile 16. The bottom edge of the second side portion 28 of the automobile cover 10 is located at or slightly below the approximate location of the lower portion of the window frame 24 of the right front door 25 of the automobile 16.

In assembling the automobile cover 10 in a single piece, the front edge of the roof-covering portion 20 of the automobile cover 10 is attached to the rear edge of the window-covering portion 12 of the automobile cover 10. The front edge of the first side portion 26 of the automobile cover 10 is attached to the left side edge of the window-covering portion 12 of the automobile cover 10, and the top edge of the first side portion 26 of the automobile cover 10 is attached to the left side edge of the roof-covering portion 20 of the automobile cover 10. Similarly, the front edge of the second side portion 28 of the automobile cover 10 is attached to the right side edge of the window-covering portion 12 of the automobile cover 10, and the top edge of the second side portion 28 of the automobile cover 10 is attached to the right side edge of the roof-covering portion 20 of the automobile cover 10.

Depending on the material used in fabricating the window-covering portion 12 of the automobile cover 10, the roof-covering portion 20 of the automobile cover 10, the first side portion 26 of the automobile cover 10, and the second side portion 28 of the automobile cover 10, the four main segments of the automobile cover 10 may be stitched together, glued together, heat-sealed together, or attached by a combination of these methods. The automobile cover 10 may be made of a variety of thin, flexible sheet materials, including vinyl, fabric, and fabric-reinforced vinyl. In the preferred embodiment, fabric-reinforced waterproof vinyl material with a soft inside lining to prevent scratching is used to afford the maximum degree of protection to the automobile 16. If the application of the automobile cover 10 is primarily for keeping sunlight out of the automobile 16, the color of the automobile cover 10 may be white or another light-colored shade.

In the preferred embodiment of the present invention, the automobile cover 10 includes thickened segments of material 30 and 32 located respectively on the first and second side portions 26 and 28 of the automobile cover 10 in locations near the top and front edges of the first and second side portions 26 and 28 of the automobile cover 10, as shown in FIGS. 2 and 4. For example, the thickened segments of material 30 and 32 may be approximately one to six inches away from the top and front edges of the first and second side portions 26 and 28, respectively, of the automobile cover 10.

The thickened segment of material 30 is positioned near the top and front edges of the first side portion 26 of the automobile cover 10 so that the thickened segment of material 30 is just inside the automobile 16 when the window frame 22 and the left front door 23 are closed to secure the first side portion 26 of the automobile cover 10 between the window frame 22 of the left front door 23 and the left front door frame of the automobile 16. The thickened segment of material 30 in the first side portion 26 of the automobile cover 10 prevents the first side portion 26 of the automobile cover 10 from being pulled out of the window frame 22 of the left front door 23 by someone attempting to steal the automobile cover 10.

In like fashion, the thickened segment of material 32 is positioned on the top and front edges of the second side portion 28 of the automobile cover 10 so that the thickened segment of material 32 is just inside the automobile 16 when the window frame 24 and the right front door 25 are closed to secure the second side portion 28 of the automobile cover 10 between the window frame 24 of the right front door 25 and the right front door frame of the automobile 16. The thickened segment of material 32 in the second side portion 28 of the automobile cover 10 prevents the second side portion 28 of the automobile cover 10 from being pulled out of the window frame 24 of the right front door 25.

In the preferred embodiment, the thickened segments of material 30 and 32 are piping which is sewn into the first and second side portions 26 and 28 of the automobile cover 10. Instead of using piping, small balls (not shown) may be attached at intervals to the first and second side portions 26 and 28 of the automobile cover 10. Alternatives to the use of piping or small balls include other rolls of material attached to the first and second side portions 26 and 28 of the automobile cover 10, or any type or configuration object or objects having a thickness sufficient to prevent the first and second side portions 26 and 28 of the automobile cover 10 from being pulled out of the window frames 22 and 24 of the left and right front doors 23 and 25, respectively.

Also included in the preferred embodiment of the present invention are small weights 34 and 36 located on the bottom edges of the first and second side portions 26 and 28 of the automobile cover 10, respectively. The weights 34 and 36, which are shown schematically in FIGS. 2 and 4, function to hold the automobile cover 10 on the automobile 16 when it is being installed, before the front doors 23 and 25 are closed. This operation of the weights 34 and 36 serves to facilitate the installation of the automobile cover 10 by a single person. The weights 34 and 36 function to hold the automobile cover 10 snugly on the automobile 16 when the front doors 23 and 25 are being closed, thereby according the automobile cover 10 a desirable snug fit on the automobile 16 when the automobile cover 10 is installed.

The automobile cover 10 is installed by opening the front doors 23 and 25 of the automobile 16, and placing the window-covering portion 12 of the automobile cover 10 over the windshield 14 of the automobile 16 and the roof-covering portion 20 of the automobile cover 10 over the front portion of the roof 21 of the automobile 16. The first and second side portions 26 and 28 of the automobile cover 10 will hang down in the front door frames of the automobile due to the weights 34 and 36. The front doors 23 and 25 may then be closed to secure the first and second side portions 26 and 28 of the automobile cover 10 between the window frames 22 and 24 of the left and right front doors 23 and 25, respectively, and the front door frames of the automobile 16.

In a variation, the automobile cover 10 of the present invention may be placed over the rear window 38 and the rear portion of the roof 21 of a four-door automobile 16A, as shown in FIG. 3. In this case, the first side portion 26 of the automobile cover 10 will be secured between the window frame 40 of the right rear door 41 of the automobile 16A and the right rear door frame of the automobile 16A. Similarly, the second side portion 28 of the automobile cover 10 will be secured between the window frame 42 (not shown) of the left rear door 43 (not shown) of the automobile 16A and the left rear door frame of the automobile 16A. This arrangement is particularly useful either when the automobile cover 10 is used in conjunction with a second automobile cover (not shown) installed over the windshield 14 and the front portion of the roof 21, or when the automobile cover 10 is being used to keep sunlight directed toward the automobile 16A from the rear from entering and heating the interior of the automobile 16A.

It will be realized by those skilled in the art that with the number of different automobiles available, the automobile cover 10 of the present invention may need to be manufactured in several sizes to accord a superior fit to virtually any car or truck. Therefore, the automobile cover 10 may be made, for example, in three sizes, one of which will fit virtually any car or small truck available. In addition, the automobile cover 10 may also be made in a larger size adaptable to fit large trucks.

It is thus apparent from the above description of the preferred embodiment of the present invention that it provides a cover apparatus which covers both the windshield and the front portion of the roof of a car where a moonroof (if the car has one) is located. The improved cover of the present invention presents a high degree of protection by completely covering the entire front portion of the roof of a car as well as the entire windshield, in a snug and secure fashion not vulnerable to removal or displacement by the wind. In addition to preventing the windshield from being covered by snow or sleet in inclement weather, the improved cover of the present invention also advantageously protects the interior of an automobile from the hot sun.

The improved cover of the present invention may be easily and quickly installed by a single person, without any need for either assistance or tools. In addition, it is of simple, one-piece construction to further facilitate installation, removal, and storage of the cover. The improved cover has effective anti-theft provisions built into the cover, with these anti-theft provisions not increasing the difficulty of installation or removal of the cover.

The improved cover of the present invention is of inexpensive construction enabling it to be marketed advantageously, and it may be made in several sizes, one of which is adaptable to fit virtually any car or truck. The cover is durable and long-lasting, and thereby provides a high degree of quality even though the cover is of inexpensive construction. Finally, the improved cover of the present invention provides all of the aforesaid advantages and objectives without resulting in any significant disadvantage.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A cover for covering the windshield and the front portion of the roof and front door windows of a car or truck having two front doors, and door frames, said front doors have front, rear, top and bottom sides and windows therein, comprising:
    a window-covering segment made of thin, flexible sheet material, said window-covering segment being sufficiently large to cover the windshield of a car or truck from top to bottom and from side to side;
    a roof-covering segment made of thin, flexible sheet material, said roof-covering segment being attached at the front thereof to the rear of said window-covering segment at a location approximately adjacent the top of the windshield, said roof-covering segment extending back on the roof of the car or truck from said window-covering segment to at least the rear of said front doors, and being sufficiently large to cover the front portion of the roof of the car or truck from one side of the roof of the car or truck to the other;
    a first combination side window covering and anti-theft side segment consisting of a single thin, flexible sheet material, said first side segment being attached to the left sides of said window-covering segment and said roof-covering segment, said first side segment being configured similarly to the shape of a window frame of a left front door of the car or truck, and sufficiently large enough to cover substantially all of the side window, said first side segment being located and secured between the left front door of the car or truck and the left front door frame of the car or truck whereby said first side segment is releasably retained between the left front door and the left front door frame; and
    a second combination side-window covering and anti-theft side segment consisting of a single thin, flexible sheet material, said second side segment being attached to the right sides of said window-covering segment and said roof-covering segment, said second side segment being configured similarly to the shape of a window frame of a right front door of the car or truck, and sufficiently large enough to cover substantially all of the side window, said second side segment being installed and secured between the right front door of the car or truck and the right front door frame of the car or truck, whereby no additional means other than said first and second side segments are required to releasably hold said cover in place.

2. A cover as defined in claim 1, wherein said window-covering segment also extends over a small portion of area immediately in front of the windshield of the car or truck, the small portion of area comprising the back of the hood of the car or truck.

3. A cover as defined in claim 1, wherein said thin, flexible sheet material said window-covering segment, said roof-covering segment, and said first and second side segments are made from is a material from the group comprising vinyl, fabric, and fabric-reinforced vinyl.

4. A cover as defined in claim 3, wherein said thin, flexible sheet material is a fabric-reinforced waterproof vinyl material having a soft inside lining to prevent scratching to afford the maximum degree of protection to the car or truck said cover is installed on.

5. A cover as defined in claim 1, wherein the color of the exterior of said cover is a light color to reflect sunlight away from the car or truck.

6. A cover as defined in claim 5, wherein the color of the exterior of said cover is white.

7. A cover as defined in claim 1, wherein said roof-covering segment extends sufficiently far back toward the rear of the roof of the car or truck to cover a moonroof of a car or truck.

8. A cover as defined in claim 7, wherein said roof-covering segment extends back on the roof of the car or truck to approximately the location of the rear of the window frames of the left and right front doors of the car or truck, said first and second side segments having sufficient length to extend downward to the approximate location of the lower portion of the window frames of the left and right front doors of the car or truck.

9. A cover as defined in claim 1, additionally comprising:
    anti-theft means for preventing said cover from being stolen.

10. A cover as defined in claim 9, wherein said anti-theft means comprises:
    means for preventing said first and second side segments from being pulled out of their installed locations between the window frames of the front doors of the car or truck and the front door frames of the car or truck.

11. A cover as defined in claim 10, wherein said preventing means comprises:
    a first thickened segment of material located on said first side segment just inside the car or truck; and
    a second thickened segment of material located on said second side segment 12. A cover as defined in claim 11, wherein said first thickened segment of material is piping which is sewn into said first side segment adjacent to and spaced away from the locations at which said first side segment is attached to the left sides of said window-covering segment and said roof-covering segment, and wherein said second thickened segment of material is piping which is sewn into said second side segment adjacent to and spaced away from the locations at which said second side segment is attached to the right sides of said window-covering segment and said roof-covering segment.

13. A cover as defined in claim 11, wherein said first thickened segment of material is roll material which is sewn into said first side segment adjacent to and spaced away from the locations at which said first side segment is attached to the left sides of said window-covering segment and said roof-covering segment, and wherein said second thickened segment of material is roll material which is sewn into said second side segment adjacent to and spaced away from the locations at which said second side segment is attached to the right sides of said window-covering segment and said roof-covering segment.

14. A cover as defined in claim wherein said first and second thickened segments of material comprise:

a plurality of balls attached at intervals to said first and second side segments.

15. A cover as defined in claim 1, additionally comprising:
   means for holding said cover on the car or truck when said cover is being installed, before the front doors of the car or truck are closed, said holding means serving to facilitate the installation of said cover by a single person.

16. A cover as defined in claim 15, wherein said holding means comprises:
   a plurality of small weights located on or near to the bottom edges of said first and second side segments, respectively.

17. A cover for covering the windshield and the front portion of the roof and front door windows of a car or truck, comprising:
   a window-covering segment having two doors and windows made of thin, flexible sheet material, said window-covering segment being sufficiently large to cover the windshield of a car or truck from top to bottom and from side to side;
   a roof-covering segment made of thin, flexible sheet material, said roof-covering segment being attached at the front thereof to the rear of said window-covering segment at a location approximately adjacent the top of the windshield, said roof-covering segment extending back on the roof of the car or truck from said window-covering segment and being sufficiently large to cover the front portion of the roof of the car or truck from one side of the roof of the car or truck to the other;
   a first side segment made of thin, flexible sheet material, said first side segment being attached to the left sides of said window-covering segment and said roof-covering segment, said first side segment being configured similarly to the shape of a window frame of a left front door of the car or truck, said first side segment secured between the right window frame of the right front door of the car or truck and the right front door frame of the car or truck to secure said cover on the right side thereof;
   anti-theft means for preventing said first and second side segments from being pulled out of their installed locations between the window frames of the front doors of the car or truck and the front door frames of the car or truck; and
   means for holding said cover on the car when said cover is being installed, before the front doors of the car or truck are closed, said holding means serving to facilitate the installation of said cover by a single person.

18. A cover for covering the windshield and the front portion of the roof and front door windows of a car or truck having front doors and windows, comprising:
   a window-covering segment for covering the windshield of a car or truck;
   a roof-covering segment attached at the front thereof to the rear of said window-covering segment, said roof-covering segment covering the front portion of the roof of the car or truck;
   a first combination side window covering and anti-theft side segment consisting of a single, thin, flexible sheet material of sufficient size to cover a substantial portion of the side window attached to the left sides of said window-covering segment and said roof-covering segment, said first side segment being installed and secured between the left front door of the car or truck and the left front door frame of the car or truck; and
   a second combination side window covering and anti-theft side segment consisting of a single, thin, flexible sheet material of sufficient size to cover a substantial portion of the side window attached to the right sides of said window-covering segment and said roof-covering segment, said second side segment being installed and secured between the right front door frame of the car or truck.

19. A protective cover and sun-shield for a vehicle having a windshield, two front door frames and two front doors with windows therein comprising,
   a windshield covering segment sufficiently large enough to cover substantially all of said windshield, and
   a plurality of combination side window covering and anti-theft window covering segments, each of which is sufficiently large enough to cover substantially all of a front door window,
   whereby said windshield covering segment is disposed on the outside of the vehicle to cover substantially all of said windshield and said side window covering segments are both disposed inside the vehicle and secured between the respective front door and door frames, to simultaneously cover both of the front door windows and thereby prevent the sun from shining inside the vehicle and protect removal of the cover from outside the vehicle which the doors are closed.

20. A protective cover as set forth in claim 19 for a vehicle having a glass top portion and further including a glass top portion covering segment which covers the glass top portion.

* * * * *